United States Patent
Buslepp et al.

(10) Patent No.: US 8,538,666 B2
(45) Date of Patent: Sep. 17, 2013

(54) CPS KNOCK DETECTION SYSTEM

(75) Inventors: Kenneth J. Buslepp, Brighton, MI (US); Jose C. Zavala Jurado, Ann Arbor, MI (US)

(73) Assignee: GM Global Technology Operations LLC

( * ) Notice: Subject to any disclaimer, the term of this patent is extended or adjusted under 35 U.S.C. 154(b) by 289 days.

(21) Appl. No.: 13/158,825

(22) Filed: Jun. 13, 2011

(65) Prior Publication Data

US 2012/0316761 A1 Dec. 13, 2012

(51) Int. Cl.
*F02M 7/28* (2006.01)
*F02P 5/153* (2006.01)
*F02D 41/22* (2006.01)

(52) U.S. Cl.
USPC ..... 701/111; 123/435; 123/406.17; 73/35.12; 73/114.16

(58) Field of Classification Search
USPC .......... 123/435–436, 406.17, 406.37, 406.39, 123/406.41; 701/103, 104, 106, 107, 110, 701/111; 73/35.12, 114.16, 114.17, 114.18
See application file for complete search history.

(56) References Cited

U.S. PATENT DOCUMENTS 4,821,194 A * 4/1989 Kawamura ................... 701/111
5,168,854 A * 12/1992 Hashimoto et al. ...... 123/406.17

\* cited by examiner

*Primary Examiner* — Hai Huynh

(57) ABSTRACT

A control system includes a cylinder pressure sensor (CPS) that senses a cylinder pressure of an engine and generates a CPS signal based on the cylinder pressure. A CPS failure detection module selectively generates a failure signal based on characteristics of the CPS signal in a knock frequency range. A status detection module generates a CPS status signal based on the CPS signal and the failure signal.

18 Claims, 5 Drawing Sheets

CPS KNOCK DETECTION SYSTEM

FIELD

The present disclosure relates to engine sensor systems and, more particularly, to failure detection systems and methods for cylinder pressure engine knock sensors.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines draw air into an intake manifold through an air intake. The air is mixed with fuel to form an air-and-fuel (A/F) mixture. The NF mixture is combusted within cylinders to drive pistons, which rotatably turn a crankshaft to produce drive torque.

In certain conditions, engine knock may occur. Engine knock corresponds to a vibration resulting from uncontrolled combustion in the cylinder chamber. Engine knock over a sustained period of time results in, for example, damage to pistons, cylinder rings, and/or exhaust valves. Engine knock also increases noise/vibration/harshness (NVH). An engine control systems may implement knock detection to detect, reduce and/or prevent engine knock, thereby improving engine performance and vehicle drivability.

SUMMARY

A control system includes a cylinder pressure sensor (CPS) that senses a cylinder pressure of an engine and generates a CPS signal based on the cylinder pressure. A CPS failure detection module selectively generates a failure signal based on characteristics of the CPS signal in a knock frequency range. A status detection module generates a CPS status signal based on the CPS signal and the failure signal.

A method includes using a cylinder pressure sensor (CPS), sensing a cylinder pressure of an engine and generating a CPS signal based on the cylinder pressure, selectively generating a failure signal based on characteristics of the CPS signal in a knock frequency range, and generating a CPS status signal based on the CPS signal and the failure signal.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
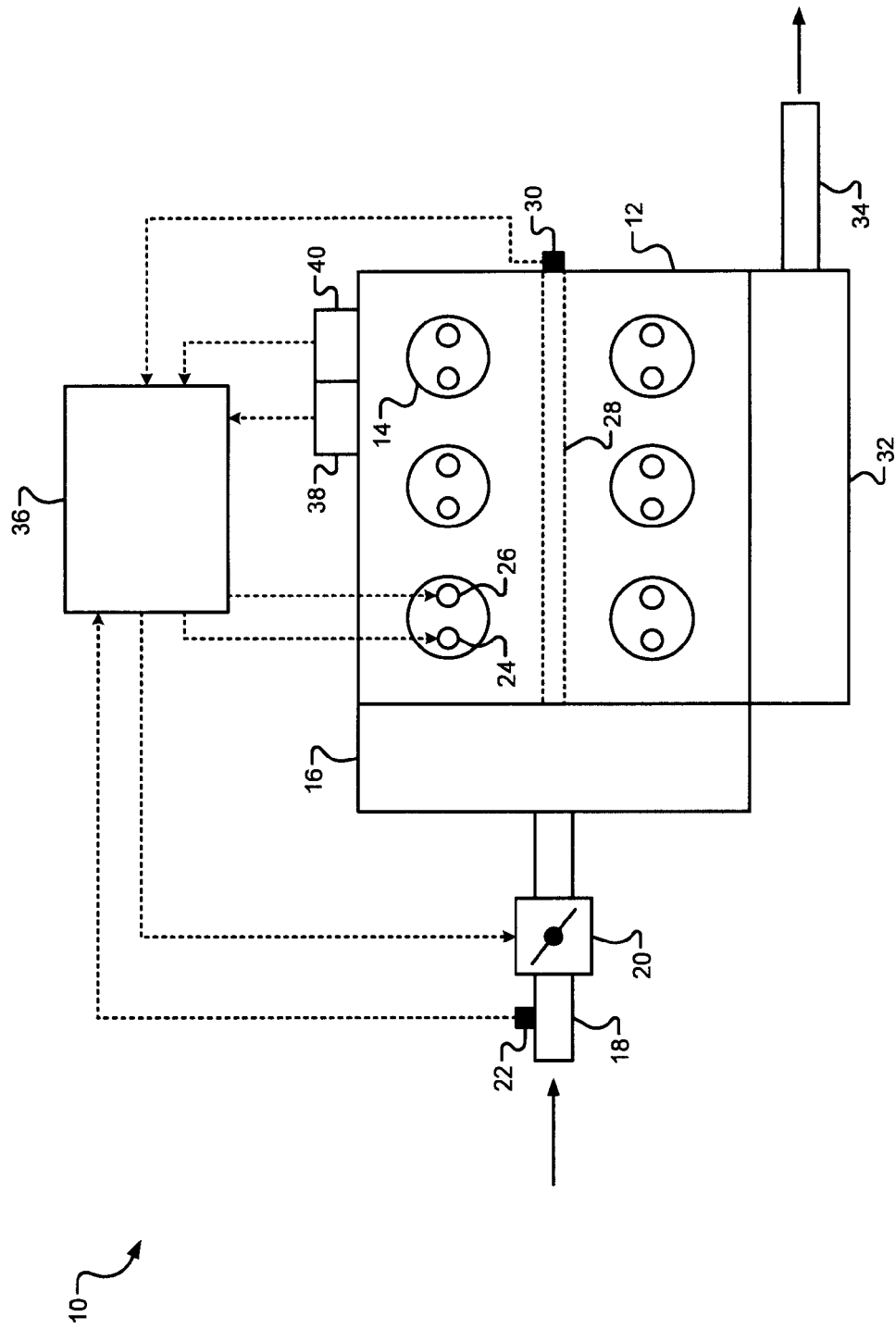
FIG. 1 is a functional block diagram of an engine system according to the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

A knock detection system for an engine may include a knock sensor (or a knock sensor for each cylinder of the engine) and a knock detection circuit. Typically, the knock sensor implements an accelerometer to detect engine knock. The knock sensor generates an analog voltage signal based on the intensity of the engine knock. The knock detection circuit processes the knock signal to detect the engine knock.

A vehicle may include a cylinder pressure sensor (CPS) to monitor pressure within cylinders of the engine. A knock detection system according to the present disclosure uses a CPS to detect engine knock. For example, the knock detection system receives a CPS signal from the CPS and detects engine knock based on the CPS signal. Further, the knock detection system measures spectral power in a combustion frequency range of the CPS signal to diagnose ability of the CPS to detect engine knock. For example, the knock detection system determines whether a bandwidth of the CPS has deteriorated to a level that is inadequate for knock detection.

Referring now to FIG. 1, vehicle 10 includes an engine 12. The engine 12 includes a plurality of cylinders 14. It may be appreciated that while 6 cylinders are shown, 3, 4, 5, 8, 10, 12, and 16 cylinder implementations may also be used. Air is drawn into the engine 12 through an intake manifold 16 and an air intake 18 that is regulated by a throttle 20. The ambient temperature of air being drawn into the engine 12 may be measured using an intake air temperature (IAT) sensor 22. The air is distributed to the cylinders 14 and combined with fuel from the fuel tank (not shown). For example, the fuel may be injected into the cylinders 14 by a plurality of fuel injectors 24.

The air-and fuel (A/F) mixture in the cylinders 14 is compressed by pistons (not shown) and combusted by a plurality of spark plugs 26. The combustion of the A/F mixture drives the pistons, which rotatably turn a crankshaft 28 to produce drive torque. An engine speed sensor 30 measures a rotational speed of the crankshaft 28. Exhaust gases are expelled from the, cylinders 14 through an exhaust manifold 32 and an exhaust system 34.

A control module 36 regulates operation of the engine 12. For example only, the control module 36 may control the throttle 20 and the fuel injectors 24 to control the A/F ratio in the engine 12. For example only, the control module 36 may control the spark plugs 26 to control the ignition timing of the engine 12.

A CPS 38 generates a cylinder pressure signal based on the pressure within one or more of the cylinders 14 of the engine 12. While one CPS 38 is shown, a plurality of cylinder pressure sensors may also be implemented. For example, one CPS may be implemented for each of the cylinders 14 to measure the pressure within the individual cylinders 14. The control module 36 receives the cylinder pressure signal from the CPS 38 and detects engine knock based on the cylinder pressure signal. Further, the control module 36 diagnoses the ability of the CPS 38 to detect engine knock based on the cylinder pressure signal.

For example only, the control module 36 also receives the IAT from the IAT sensor 22 and the engine speed from the engine speed sensor 30. The control module 36 performs digital signal processing (DSP) of the cylinder pressure signal based on expected CPS signal behavior at various known engine parameters (for example only, IAT and engine speed) to diagnose the CPS 38. The control module 36 may then vary operation of the engine 12 based on the status of the CPS 38. For example, the control module 36 may activate a fault indicator (e.g., a check engine light) or actuate the fuel injectors 24 and the spark plugs 26 based on the status of the CPS 38.

In addition to the CPS 38, the knock detection system may include one or more optional knock sensors 40 to detect engine knock. For example only, the knock sensor 40 may be included to provide redundancy when a malfunction or degradation prevents the CPS 38 from detecting engine knock (i.e., when the CPS 38 is faulty). If the vehicle 10 includes the optional knock sensor 40, the control module 36 may use the knock sensor 40 to sense engine knock instead of using the CPS 38.

Figure 2:
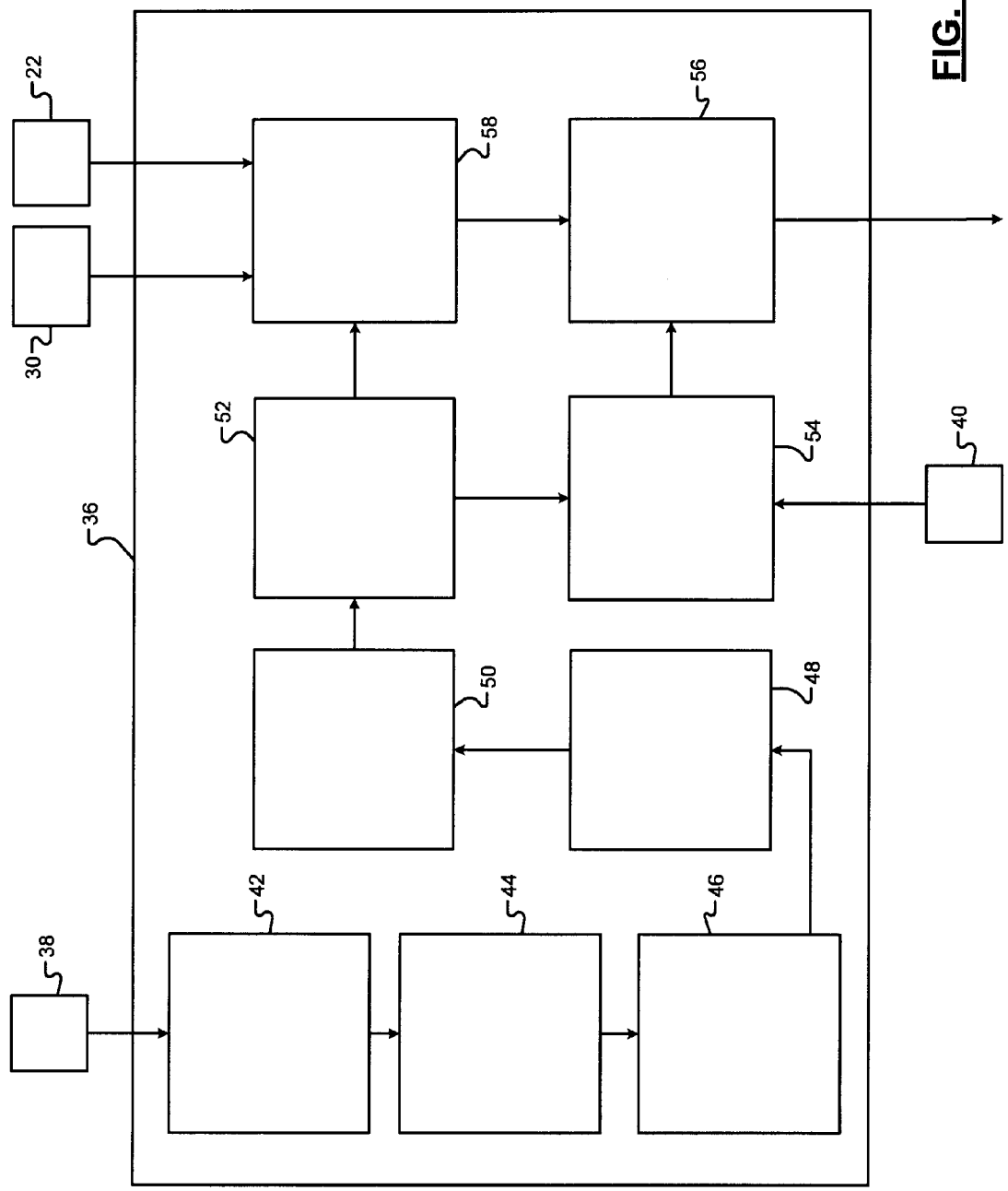
FIG. 2 is a functional block diagram of a control module according to the present disclosure.

Referring now to FIG. 2, the control module 36 is shown in more detail. The control module 36 includes an analog filtering module 42 that receives the cylinder pressure signal from the CPS 38. For example only, the analog filtering module 42 may be a first order analog filter with a critical frequency of 25 Hz. The analog filtering module 42 filters the cylinder pressure signal and provides the filtered cylinder pressure signal to an analog-to-digital (A/D) conversion module 44. The A/D conversion module 44 converts the analog cylinder pressure signal to a digital cylinder pressure signal. For example only, the A/D conversion module 44 may generate a digital signal having a minimum length of 10 bits.

A gain/attenuation module 46 receives the digital cylinder pressure signal. The gain/attenuation module 46 may apply a gain to the digital cylinder pressure signal. The gain/attenuation module 46 may also attenuate the digital cylinder pressure signal. For example only, applying a gain to and/or attenuating the cylinder pressure signal may improve the accuracy of diagnosing of the cylinder pressure sensor 38. A digital filtering module 48 receives the signal from the gain/attenuation module 46. The digital filtering module 48 performs digital filtering (e.g., DSP) of the digital cylinder pressure signal. For example only, the digital filtering module 48 may include a fourth order elliptical infinite impulse response (IIR) filter with a critical frequency (Fc) of 20 Hz. For example only, the digital filtering module 48 may alternatively include two second order elliptical IIR filters in series to improve system stability. A buffer module 50 receives the filtered digital cylinder pressure signal. The buffer module 50 buffers the cylinder pressure signal prior to fast Fourier transform (FFT) processing.

An FFT module 52 receives the cylinder pressure signal. The FFT module 52 generates one or more fast FFTs of the cylinder pressure signal. For example only, the FFT module 52 may generate 128 point or 256 point FFTs. The FFT module 52 may generate more than one FFT based on the length of the cylinder pressure signal (i.e., based on the length of a knock window within the cylinder pressure signal). For example, a longer cylinder pressure signal may require more than one FFT.

A knock detection module 54 receives the one or more FFTs. The knock detection module 54 detects engine knock based on the one or more FFTs. For example, the knock detection module 54 determines an engine knock level based on the one or more FFTs. The knock detection module 54 generates a knock control signal based on the engine knock level (e.g., when the engine knock level exceeds a predetermined engine knock threshold). The knock detection module 54 may also receive a knock signal from the optional knock sensor 40 to detect engine knock.

A knock control module 56 receives the knock control signal and controls various engine parameters based on the engine knock signal. For example, the knock control module 56 may control fuel injectors 22, spark plugs 24 and/or activate a fault indicator (e.g., a check engine light) based on the engine knock signal.

A CPS failure detection module 58 receives the FFTs from the FFT module 52. The CPS failure detection module 58 determines a status of the CPS 38 (e.g., an ability of the CPS 38 to detect engine knock) based on the one or more FFTs. For example, the CPS failure detection module 58 determines a metric of spectral power for the cylinder pressure signal based on the FFTs, and determines the status of the CPS 38 based on a metric of spectral power and one or more other engine parameters. The other engine parameters may include, for example only, engine speed and ambient temperature (e.g., IAT). While engine speed and IAT are used throughout the present disclosure as example engine parameters, it can be appreciated that the engine parameters are not limited to engine speed and IAT. Other engine parameters may include, but are not limited to, engine load.

The CPS failure detection module 58 may compare values of the spectral power of the cylinder pressure signal to expected values for the current engine speed and IAT. If the values of the spectral power do not correspond to the expected values, the CPS failure detection module 58 may determine that the CPS 38 is not able to detect engine knock.

If the CPS failure detection module 58 determines that the CPS 38 is not able to detect engine knock, the control module 36 performs open-loop knock control. For example, the control module 36 may attempt to control engine knock based on inputs other than the output of the CPS 38. For example, the control module 36 may actuate fuel injectors 24 and/or spark plugs 26 based on predetermined settings and/or use other sensor inputs to detect engine knock. For example, the other sensor inputs may correspond to the knock sensor 40.

Figure 3:
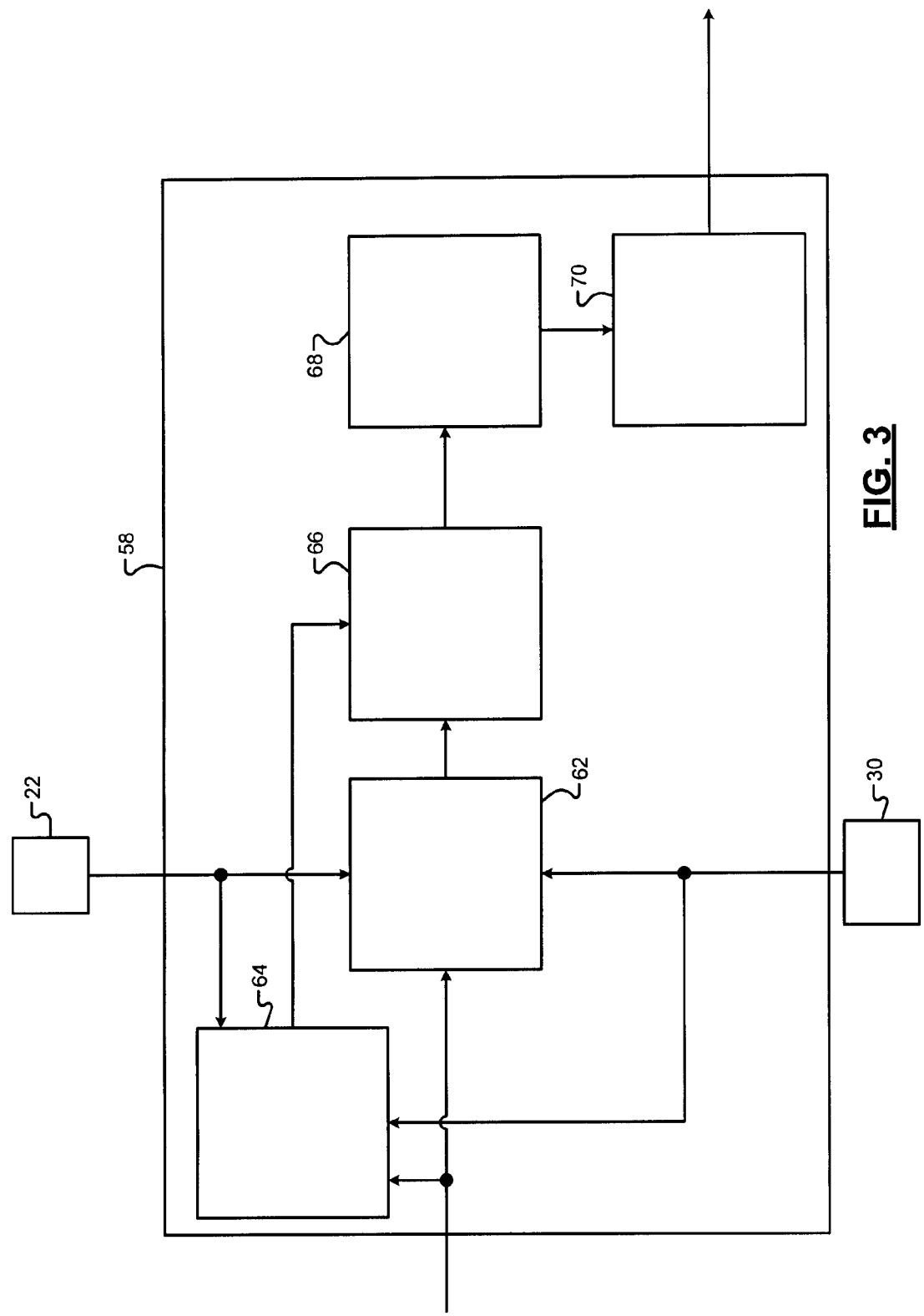
FIG. 3 is a functional block diagram of a cylinder pressure sensor failure detection module according to the present disclosure.
Figure 4:
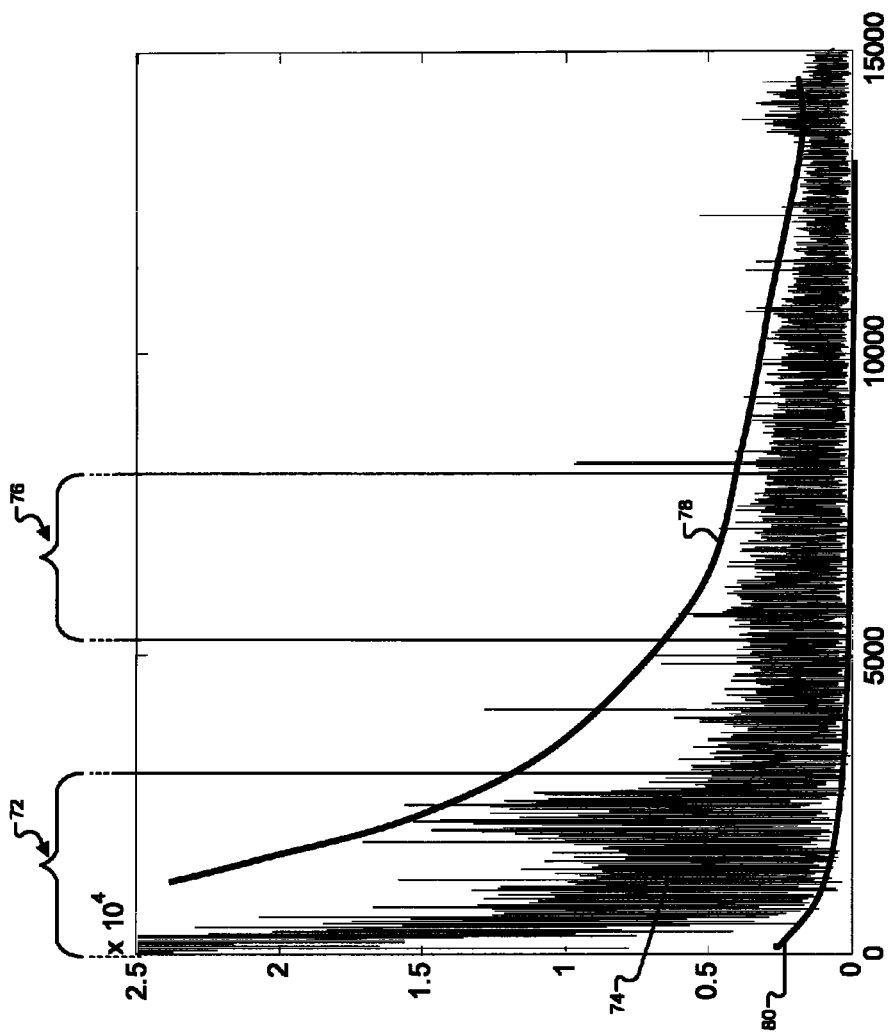
FIG. 4 is a power spectrum diagram for a cylinder pressure sensor.

Referring now to FIGS. 3 and 4, the CPS failure detection module 58 includes a combustion energy determination module 62, a limit production module 64, a failure determination module 66, a failure counting module 68, and a status determination module 70.

The combustion energy determination module 62 receives the one or more FFTs, engine speed, and IAT. The combustion energy determination module 62 selects the FFTs corresponding to a combustion frequency range 72 and extrapolates a metric of spectral power 74 based on the selected FFTs, the engine speed, and the IAT. The metric of spectral power 74 includes a knock frequency range 76 (i.e., frequencies indicative of engine knock). In other words, the combustion energy determination module 62 extrapolates a complete metric of spectral power 74, including the knock frequency range 76, based on FFTs corresponding to the combustion frequency range 72. The combustion energy determination module 62 may also sample, filter, and/or calculate the FFTs corresponding to the knock frequency range 76 to directly determine the metric of spectral power 74.

The limit production module 64 receives the one or more FFTs corresponding to the metric of spectral power 74, the engine speed, and the IAT and selects an upper spectral limit 78 and a lower spectral limit 80 accordingly. For example, the limit production module 64 may store a range of expected values of spectral power for selected FFTs, engine speed, and IAT in a knock frequency range. The upper spectral limit 78 and the lower spectral limit 80 correspond to upper and lower bounds, respectively, of the range of expected values. For example only, the limit production module 64 may include a look up table that stores the upper and lower spectral limits for a plurality of FFTs, engine speeds, and IATs.

The failure determination module 66 receives the upper spectral limit 78, the lower spectral limit 80, and the metric of spectral power 74. The failure determination module 66 compares the metric of spectral power 74 in the knock frequency range 76 to the upper spectral limit 78 and the lower spectral limit 80. The failure determination module sends a failure signal if the metric of spectral power 74 in the knock frequency range 76 is not bounded by the upper spectral limit 78 and the lower spectral limit 80 (i.e., if values of the metric of spectral power 74 exceed either the upper spectral limit 78 or the lower spectral limit 80). In other words, the failure signal indicates that the values of the metric of spectral power 74 do not correspond to expected values (e.g., in the knock frequency range 76) and therefore the CPS 38 may not able to detect engine knock.

The failure counting module 68 receives the failure signal. For example only, the failure counting module 68 may further include an X/Y-type counter (not shown). The failure counting module 68 counts a number of failure signals received during a predetermined period. For example only, the predetermined period (i.e., a reporting interval) may be 100 ms. The failure counting module 68 determines a failure count (i.e. the number of failures) during a reporting interval and outputs the failure count after the reporting interval. The failure count is reset after the reporting interval.

The status determination module 70 receives the failure count and determines a status of the CPS 38. For example, when the failure count is greater than a predetermined failure count threshold, the status determination module 70 may determine that the CPS 38 has failed and generate a failed status signal. For example only, the control module 36 may actuate fuel injectors 24 and/or spark plugs 26 based on predetermined settings and/or use other sensor inputs (e.g., from the knock sensor 40) for operation of the engine 12.

However, when the failure count is less than or equal to the predetermined failure count threshold, the status determination module 70 may determine that the CPS 38 is functioning properly. Therefore, the status determination module 70 generates a passed status signal.

Figure 5:
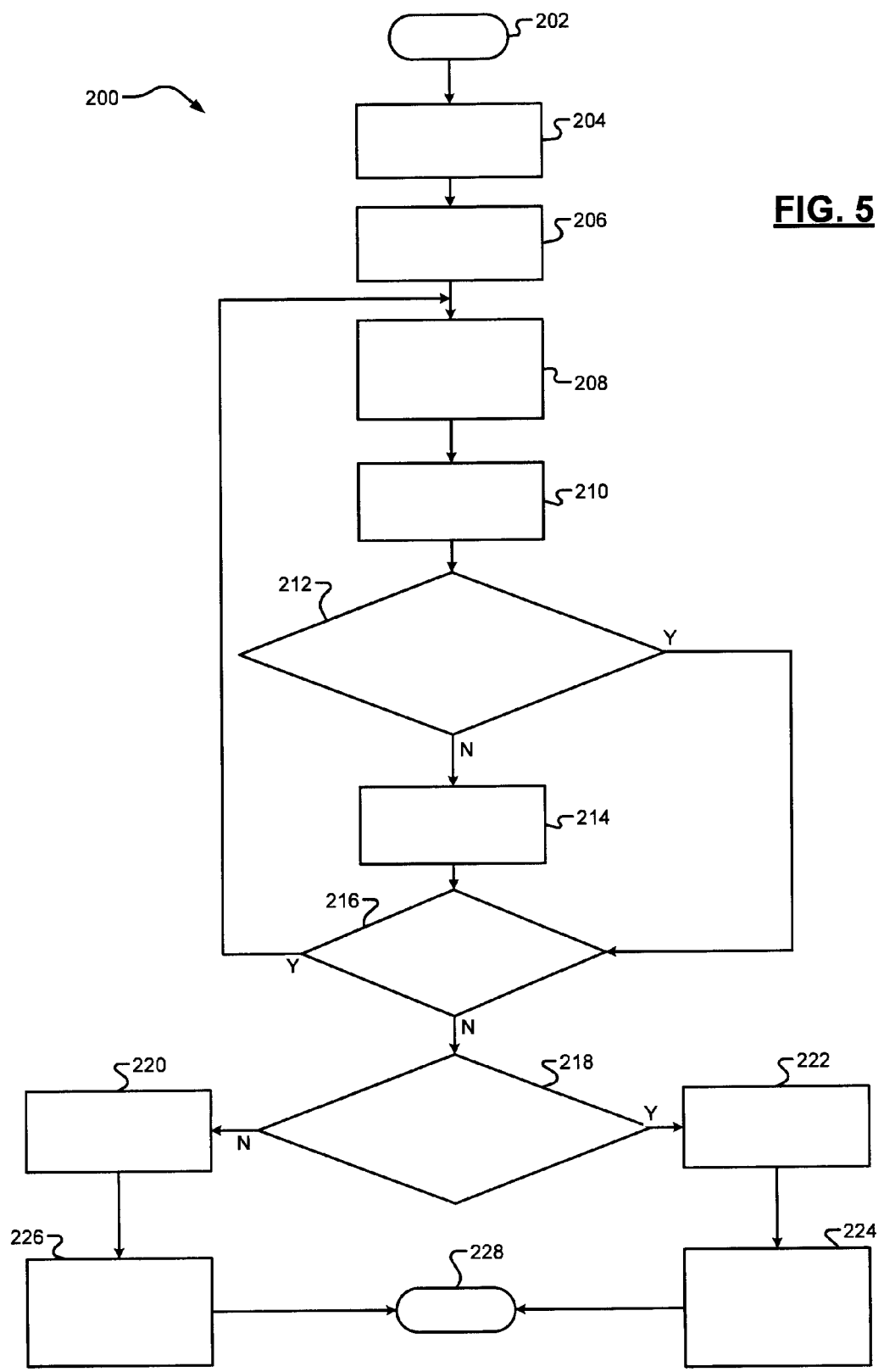
FIG. 5 is a flow diagram of a knock detection diagnostic method.

Referring now to FIG. 5, a knock detection diagnostic method 200 begins at 202. At 204, the method 200 performs digital signal processing on the cylinder pressure signal. At 206, the method 200 generates one or more fast Fourier transformations (FFTs) based on the processed cylinder pressure signal. At 208, the method 200 generates a metric of spectral power based on the FFTs in the engine combustion range and engine parameters including, for example, the engine speed and IAT.

At 210, the method 200 generates the upper spectral limit 78 and the lower spectral limit 80 based on the FFTs, engine speed, and IAT. At 212, the method 200 compares the metric of spectral power 74 to the upper spectral limit 78 and the lower spectral limit 80. If the metric of spectral power 74 in the knock frequency range 76 is between the upper spectral limit 78 and the lower spectral limit 80, the method 200 proceeds to 214. If not, the method 200 proceeds to 212.

At 214, the method 200 increments the failure count. At 216, the method 200 determines whether the reporting time interval has expired. For example only, the reporting time window may be 100 ms. If yes, the method 200 returns to 208. If no, the method 200 proceeds to 218.

At 218, the method 200 determines whether the failure count is less than a predetermined failure count threshold. If no, the method 200 proceeds to 220. If yes, the method proceeds to 222. At 222, the method 200 determines that the CPS 38 is functioning properly. At 224, the method 200 actuates fuel injectors 24 and/or spark plugs 26 based on the cylinder pressure signal, and ends in step 228.

At 220, the method 200 determines that the CPS 38 has failed (for example only, due to an open circuit, degradation of the power spectrum of the CPS 38, etc). At 226, the method 200 actuates fuel injectors 24 and/or spark plugs 26 based on predetermined settings or sensor inputs other than the CPS 38. For example, the other sensor inputs may be accelerometers (i.e., knock sensors 40) on the cylinders 14. The method 200 then ends at 228.

Those skilled in the art can now appreciate from the foregoing description that the broad teachings of the disclosure can be implemented in a variety of forms. Therefore, while this disclosure includes particular examples, the true scope of the disclosure should not be limited since other modifications will become apparent to the skilled practitioner upon a study of the drawings, the specification, and the following claims.

What is claimed is:

1. A control system comprising:
   a cylinder pressure sensor (CPS) that senses a cylinder pressure of an engine and generates a CPS signal based on the cylinder pressure;
   a CPS failure detection module that selectively generates a failure signal based on characteristics of the CPS signal in a knock frequency range; and
   a status detection module that generates a CPS status signal based on the CPS signal and the failure signal.

2. The control system of claim 1, further comprising:
   a fast Fourier transform (FFT) module that generates an FFT based on the CPS signal, wherein the FFT includes a plurality of subsets corresponding to a plurality of frequency ranges.

3. The control system of claim 1, wherein the characteristics of the CPS signal in the knock frequency range include a metric of spectral power, and wherein the metric of spectral power is based on at least one engine parameter.

4. The control system of claim 3, wherein the CPS failure detection module selectively generates the failure signal further based on an upper spectral limit and a lower spectral limit, wherein the upper spectral limit and the lower spectral limit are based on the at least one engine parameter and a combustion frequency range of the CPS signal.

5. The control system of claim 4, wherein the at least one parameter includes engine speed, ambient temperature, engine load, and FFTs corresponding to the combustion frequency range.

6. The control system of claim 4, wherein the CPS failure detection module includes a failure determination module that determines the CPS status signal based on the upper spectral limit, the lower spectral limit, and the metric of spectral power.

7. The control system of claim 6, wherein the failure determination module determines the CPS status signal based on whether the metric of spectral power is within the upper spectral limit and the lower spectral limit.

8. The control system of claim 7, wherein a failure count is incremented when the CPS status signal indicates that the metric of spectral power is not within the upper spectral limit and the lower spectral limit.

9. The control system of claim 8, further comprising a knock control module that actuates one or more of a plurality of fuel injectors and a plurality of spark plugs based on the CPS signal and the failure count.

10. A method comprising:
using a cylinder pressure sensor (CPS), sensing a cylinder pressure of an engine and generating a CPS signal based on the cylinder pressure;
selectively generating a failure signal based on characteristics of the CPS signal in a knock frequency range; and
generating a CPS status signal based on the CPS signal and the failure signal.

11. The method of claim 10, further comprising:
generating a fast Fourier transform (FFT) based on the CPS signal, wherein the FFT includes a plurality of subsets corresponding to a plurality of frequency ranges.

12. The method of claim 10, wherein the characteristics of the CPS signal in the knock frequency range include a metric of spectral power, and wherein the metric of spectral power is based on at least one engine parameter.

13. The method of claim 12, further comprising selectively generating the failure signal further based on an upper spectral limit and a lower spectral limit, wherein the upper spectral limit and the lower spectral limit are based on the at least one engine parameter and a combustion frequency range of the CPS signal.

14. The method of claim 13, wherein the at least one engine parameter includes engine speed, ambient temperature, engine load, and FFTs corresponding to the combustion frequency range.

15. The method of claim 13, further comprising determining the CPS status signal based on the upper spectral limit, the lower spectral limit, and the metric of spectral power.

16. The method of claim 15, further comprising determining the CPS status signal based on whether the metric of spectral power is within the upper spectral limit and the lower spectral limit.

17. The method of claim 16, further comprising incrementing a failure count when the CPS status signal indicates that the metric of spectral power is not within the upper spectral limit and the lower spectral limit.

18. The method of claim 17, further comprising actuating one or more of a plurality of fuel injectors and a plurality of spark plugs based on the CPS signal and the failure count.

* * * * *